United States Patent
Pattern

(10) Patent No.: US 6,512,987 B1
(45) Date of Patent: Jan. 28, 2003

(54) METHOD AND APPARATUS FOR OPERATING CORIOLIS FLOWMETERS AT CRYOGENIC TEMPERATURES

(75) Inventor: Andrew T. Pattern, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 09/533,026

(22) Filed: Mar. 22, 2000

(51) Int. Cl.[7] .................................................. G01F 1/00
(52) U.S. Cl. .................... 702/100; 702/99; 73/861.355; 73/861.356
(58) Field of Search ............................ 702/45, 50, 56, 702/99, 100, 130; 73/861.354, 861.355, 861.356

(56) References Cited

U.S. PATENT DOCUMENTS

| | | | |
|---|---|---|---|
| 5,027,662 A | | 7/1991 | Titlow et al. |
| 5,301,557 A | * | 4/1994 | Cage et al. ............ 73/861.355 |
| 5,381,697 A | | 1/1995 | van der Pol |
| 5,753,827 A | | 5/1998 | Cage |
| 5,907,104 A | * | 5/1999 | Cage et al. ............ 73/861.355 |
| 6,092,429 A | * | 7/2000 | Cunningham et al. . 73/861.356 |
| 6,227,059 B1 | * | 5/2001 | Schott et al. .......... 73/861.356 |

OTHER PUBLICATIONS

H.M. Ledbetter, "Stainless–Steel Elastic Constants at Low Temperatures," J. Appl. Phys., vol. 52 (No. 3), p. 1587–1589, (Mar. 1981).

* cited by examiner

Primary Examiner—Bryan Bui
(74) Attorney, Agent, or Firm—Faegre & Benson LLP

(57) ABSTRACT

A Coriolis flowmeter is operated to generate accurate output material flow information over a wide temperature range that includes cryogenic temperatures. Heretofore, temperature compensation was provided using linear expressions that erroneously assumed the value of Young's Modulus E varied linearly with temperature. This resulted in unacceptable output information errors. The Coriolis flowmeter of the present invention uses non-linear compensation information stored in memory to generate accurate non-linear temperature compensated material flow output information at all temperatures including cryogenic temperatures. In one embodiment, the stored non-linear information represents measured values of Young's Modulus E that are used to generate accurate temperature compensated material flow output information. In another embodiment, the measured values of Young's Modulus E are curve fitted to derive non-linear expressions that are stored for use in generating the accurate non-linear temperature compensated output information.

44 Claims, 8 Drawing Sheets

METHOD AND APPARATUS FOR OPERATING CORIOLIS FLOWMETERS AT CRYOGENIC TEMPERATURES

FIELD OF THE INVENTION

Figure 1:
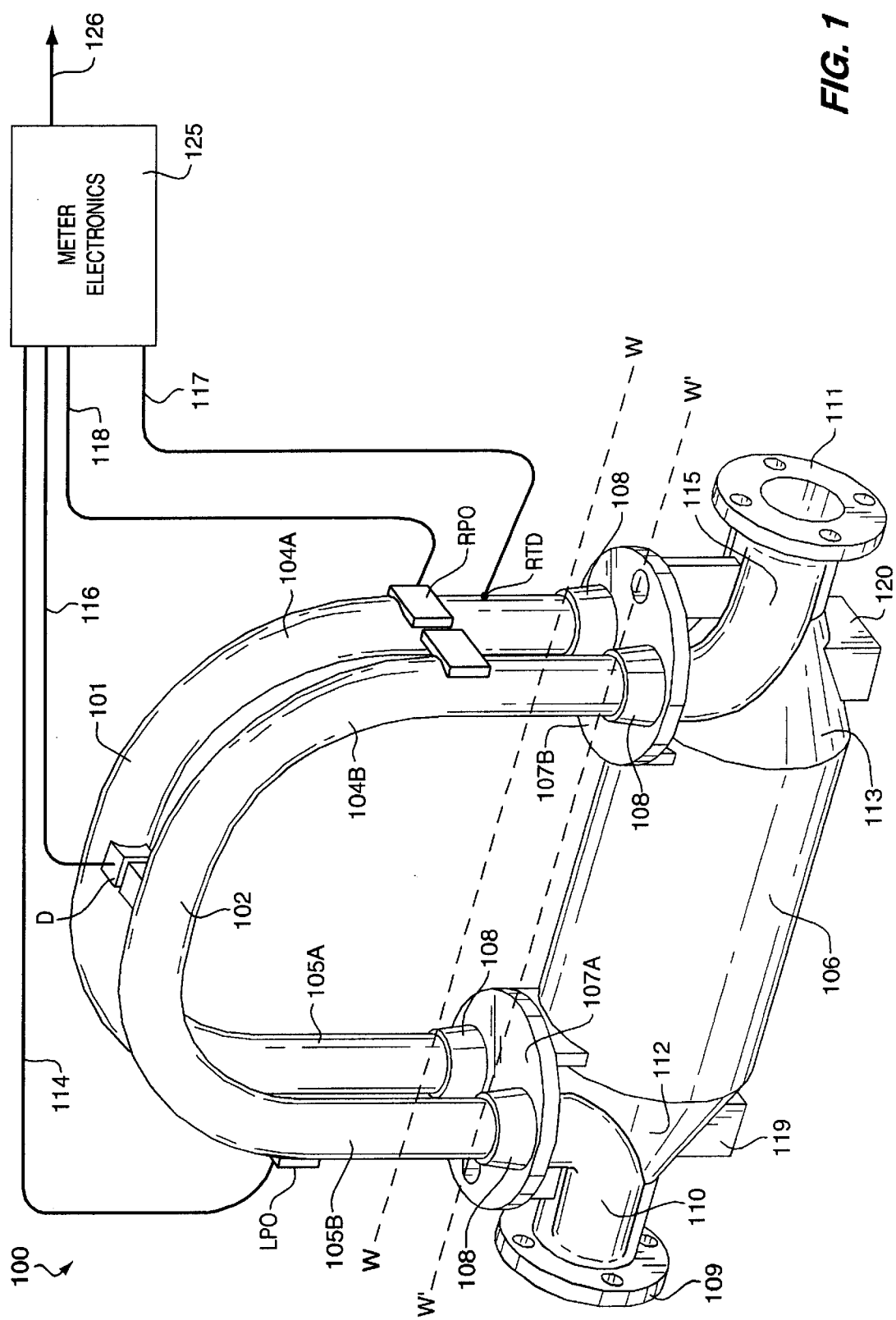

This invention relates to apparatus for and a method of operating Coriolis flowmeters over an extended temperature range that includes cryogenic temperatures. More particularly, the invention provides apparatus for and a method of generating accurate output temperature compensated flow information by a Coriolis flowmeter operated at cryogenic temperatures.

Problem

It is known to use Coriolis effect mass flowmeters to measure mass flow and other information pertaining to a material flow as disclosed in U.S. Pat. No. 4,491,025 issued to J. E. Smith, et al. of Jan. 1, 1985 and Re. 31,450 to J. E. Smith of Feb. 11, 1982. These flowmeters have one or more flow tubes of a straight or curved configuration. Each flow tube configuration has a set of natural vibration modes, which may be of a simple bending, torsional, radial, or coupled type. Each flow tube is driven to oscillate at resonance in one of these natural modes. The natural vibration modes of the vibrating, material filled Coriolis flowmeter system are defined in part by the combined mass of the flow tubes and the material within the flow tubes. Material flows into the flowmeter from a connected material source on the inlet side of the flowmeter. The material is then directed through the flow tube or flow tubes and exits the flowmeter to a material destination connected on the outlet side of the flowmeter.

A driver applies a vibrational force to the flow tube to cause the flow tube to oscillate. When there is no material flowing through the flowmeter, all points along a flow tube oscillate with an identical phase. As a material begins to flow, Coriolis accelerations cause each point along the flow tube to have a different phase with respect to other points along the flow tube. The phase on the inlet side of the flow tube lags the driver, while the phase on the outlet side leads the driver. Sensors are placed at two different points on the flow tube to produce sinusoidal signals representative of the motion of the flow tube at the two points. A phase difference of the signals received from the two sensors is calculated in units of time. The phase difference between the two signals is proportional to the mass flow rate of the material flowing through the flow tube or flow tubes.

Coriolis flowmeters are in wide spread use that generated accurate information regarding material flow. This information includes material mass flow rate as well as material density. Coriolis flowmeters range in size from those having a flow tube diameter of 0.16 centimeters to those having a diameter of 15 centimeters. These flowmeters serve a wide range of material flow rates ranging from approximately several drops per minute, such as for use in anesthesiology systems, to several tons a minute, such as those used in oil pipelines or for the loading and unloading of oil tankers. Regardless of size, most of the applications in which Coriolis flowmeters are used require a high degree of accuracy such as, a maximum error of 0.10%. This accuracy can be achieved by many of the currently available Coriolis flowmeters provided they are operated at the conditions for which each flowmeter is designed.

Operating temperature is a condition of paramount concern to a Coriolis flowmeter. A typical range of operating temperatures for a Coriolis flowmeter is approximately 33 k to 473 k (−240° C. to +200° C.). In designing a Coriolis flowmeter to generate accurate output information under this temperature range, the thermal stresses generated within the Coriolis flowmeter as well as temperature differentials between the internal parts of the Coriolis flowmeter must be considered. The design must include a consideration of the thermal expansion/contraction of the various parts of the Coriolis flowmeter to prevent damage to these parts as well as to compensate for the affect this thermal expansion/contraction may have on the output accuracy of the flowmeter.

The output data of a Coriolis flowmeter that is of great importance is the mass flow rate since the accuracy of most data generated by the Coriolis flowmeter is dependent upon the accuracy of the mass flow rate. The accuracy of the mass flow rate is dependent upon the accuracy of the Young's Modulus E term used in the mass flow rate determination. An accurate determination of mass flow rate requires that Young's Modulus E be determined with precision over the temperature range in which the Coriolis flowmeter operates. It is often assumed that the Young's Modulus E variation with temperature is linear over the temperature range with which the Coriolis flowmeter operates. Therefore, Young's Modulus E is typically calculated using a linear expression containing a temperature term T representing the measured temperature of the Coriolis flowmeter. This linear expression for E is then used to determine the mass flow rate.

The above assumptions are satisfactory for temperature ranges for which Young's Modulus E varies linearly with temperature. However, the above assumptions are not useful in determining Young's Modulus E at cryogenic temperatures (those below 273 k). It is known from an article by HM Ledbetter from the *Journal of Applied Physics* of March 1981 that the Young's Modulus E for stainless steel varies linearly over a range of approximately 100 k to 300 k and higher; but has a non-linear variation at cryogenic temperatures, such as those below 100 k.

The use of an assumed linear variation of E at cryogenic temperatures results in a calculation of Young's Modulus E that has an unacceptable accuracy. The use of a linear expression for Young's Modulus E at cryogenic temperatures requires that the calculated Young's Modulus E be altered by an arbitrary amount for each different cryogenic temperature to determine Young's Modulus E and, in turn, the mass flow rate of the Coriolis flowmeter with a satisfactory accuracy. This procedure however, is cumbersome and is limited to a small number of predetermined temperatures.

Solution

The above and other problems are solved and an advance in the art is achieved by the apparatus and method of the present invention which calculates Young's Modulus E with accuracy over the conventional range of the conventional temperature range of −100° C. to +200° C. as well as at cryogenic temperatures below −100° C. and down to −269° C.

The apparatus and method of the present invention involves the steps of calculating Young's Modulus E for a wide range of temperatures ranging from 4 k to 473 k. It does this by applying non-linear curve fitting to priorly measured data representing Young's Modulus E for the temperature range of interest. This provides a non-linear expression characterizing Young's Modulus E over this temperature range. This non-linear expression is then used in the mass flow rate calculation to generate an accurate mass flow rate.

The step of subjecting a range of measured values of Young's Modulus E to non-linear curve fitting may involve deriving a plurality of expressions for Young's Modulus E including a linear expression as well as expressions of the second, third, and fourth order, or higher orders. The expression for each order is unique. The first order linear expression contains a term of T. The second order expression contains the terms $T^2$ and T. The third expression contains terms $T^3$, $T^2$, and T. The fourth order expression contains the terms $T^4$, $T^3$, $T^2$, and T. These expressions are evaluated compared to determine the accuracy of the output data each generates. The expression of the lowest order that yields the desired accuracy is used. It was found that Young's Modulus E expression becomes increasingly accurate for the higher order expressions for cryogenic temperatures. All expressions generate a Young's Modulus E having an accuracy of at least 0.15% down to an approximately −100° C. Below that temperature, the error for the first order linear curve fit increases exponentially to an unacceptable level of more than 5% error. The second order expression containing $T^2$ and T produces acceptable results down to approximately −150° C. Below that, its error increases exponentially up to more than 3%. The third order expression containing $T^3$, $T^2$, and T has an acceptable error rate down to approximately −200° C. Its error rate increases exponentially for temperatures below −200° C. The fourth order expression has an acceptable error rate down to approximately −200° C. and then increases to an error rate of approximately 1.5% for lower temperatures.

In summary, the apparatus and method of the present invention uses measured values of Young's Modulus E, subjects them to curved fitting operations that generate a linear first order linear expression as well as higher order non-linear expressions. These expressions are used for the Young's Modulus E term in the calculation used to determine the mass flow rate. Each expression is advantageous for a unique range of Coriolis flowmeter operating temperatures. The first order linear expression produces acceptable accuracy for limited range of operating temperatures. The second order expression produces acceptable results for a wider range of operating temperatures. The third and fourth order expressions each are advantageous for increased ranges of operating temperatures.

Aspects

An aspect of the invention includes a Coriolis flowmeter having a fluid flow to derive non-linear temperature compensated output information, said method comprising:

measuring the operating temperature T of a flow tube means of said Coriolis flowmeter, storing non-linear temperature compensation information for material embodying said flow tube means, defining an expression relating said operating temperature T to said non-linear temperature compensation information, and solving said defined expression to generate non-linear temperature compensated fluid flow output information for said Coriolis flowmeter at said operating temperature T.

Preferably said step of solving said defined expression includes the step of determining a non-linear temperature compensated mass flow rate $\dot{M}$ for the fluid flow in said Coriolis flowmeter.

Preferably said operating temperature T is measured and stored in a memory of said meter electronics.

Preferably storing said non-linear temperature compensation information in said memory; and reading said non-linear temperature compensation information out of said memory for use in said defined expression to generate non-linear temperature compensated fluid flow output information for said Coriolis flowmeter at said operating temperature.

Preferably said non-linear temperature compensation information comprises the step of storing measured values of Young's Modulus E for a predetermined range of temperatures of said material embodying said flow tube means.

Preferably said non-linear temperature compensation information includes the step of storing measured values of Young's Modulus E for a predetermined range of temperatures of said material embodying flow tube means, said method further includes the steps of:

determining E for said operating temperature T, and using said determined E in said defined expression that is solved to generate said non-linear temperature compensated fluid flow output information.

Preferably said defined expression includes the step of determining a non-linear temperature compensated mass flow rate $\dot{M}$ for the fluid flow in said Coriolis flowmeter.

Preferably said step of using said determined E includes the steps of:

using said operating temperature T to access the location of said memory that stores the value of E corresponding to said operating temperature T, and reading said value of E from said memory for use in solving said defined expression.

Preferably said Coriolis flowmeter includes: a method and apparatus that reads the value of E from said accessed location when said operating temperature T corresponds to a location in said memory;

determining that a received value of T does not correspond to a location in said memory;

determining the location in said memory corresponding to a value of T that is the closest to said received value of T; and determining a value of E for said received value of T by interpolating of the value of E for said location having a value of T that is the closest to said received value of T and that using said interpolated value of T in said defined expression that is solved to generate said non-linear temperature compensated fluid flow output information.

Preferably said step of solving:

obtaining a non-linear expression for said non-linear temperature compensation information as a function of T, and using said non-linear expression for said non-linear temperature compensation information in said defined expression to generate non-linear temperature compensated fluid flow output information for said Coriolis flowmeter.

Preferably said steps of obtain and using inludes the steps of:

obtaining a non-linear expression for Young's Modulus E as a function of T, and using said non-linear expression for Young's Modulus E in said defined expression to generate non-linear temperature compensated fluid flow output information for said Coriolis flowmeter.

Preferably said step of determining said non-linear temperature compensated flow output information includes the step of determining a non-linear temperature compensated mass flow rate $\dot{M}$ for said fluid flow.

Preferably said non-linear temperature compensation information information for said material embodying said flow tube means includes measured values of Young's Modulus E for a plurality of measured operating temperatures T of said flow tube means; said meter electronics:

curve fitting said measured values of E to obtain said non-linear expression for E expressed as a function of T, and using said non-linear expression for Young's modulus E in said defined expression to generate said non-linear temperature compensated fluid flow output information for said Coriolis flowmeter.

Preferably said measured values of E are stored in a memory of Coriolis flowmeter.

Preferably said meter electronics receives said operating temperature T and applies said operating temperature T to said expression to generate said non-linear temperature compensated fluid flow output information.

Preferably said step of curve fitting performs an n order curve fit for said values of Young's Modulus E to generate an equation for determining said temperature compensation output information wherein n is greater than 1.

Preferably said step of curve fitting performs a second order curve fit for said values of Young's Modulus E for use said expression for determining said non-linear temperature compensated fluid flow output information for said Coriolis flowmeter.

Preferably said step of curve fitting performs a third order curve fit for said values of Young's Modulus E for use said expression for determining said non-linear temperature compensated fluid flow output information for said Coriolis flowmeter.

Preferably said step of curve fitting performs a fourth order curve fit for said values of Young's Modulus E for use in said expression for determining said non-linear temperature compensated fluid flow output information for said Coriolis flowmeter.

Preferably said step of curve fitting performs a fifth order curve fit for said values of Young's Modulus E for use in said expression for determining said non-linear temperature compensated fluid flow output information for said Coriolis flowmeter.

Preferably the step of receiving fluid flow output information that embodies linear temperature compensation for Young's Modulus E of said material embodying the flow tube means of said Coriolis flowmeter;

receiving the operating temperature T of said Coriolis flowmeter;

removing said linear temperature compensation from said output information of said Coriolis flowmeter to provide an uncompensated fluid output flow information for said Coriolis flowmeter;

using said defined expression relating said operating temperature T and to said non-linear temperature compensation information, and solving said defined expression to generate non-linear temperature compensated fluid flow output information for said Coriolis flowmeter at said operating temperature T.

Preferably said stored non-linear temperature compensation information for said material embodying said flow tube means includes a plurality of non-linear expressions for Young's Modulus E expressed as a function of operating temperature T, said meter electronics;

receiving said operating temperature T;

using said received operating temperature T to select one of said plurality of non-linear expressions; and using said selected non-linear expression for Young's module E in said defined expression to generate said non-linear temperature compensated flow output information for said Coriolis flowmeter.

Another aspect of the invention is a flow tube means adapted to be vibrated while receiving a fluid flow, meter electronics that receives signals from pick offs coupled to said vibrating flow tube means, said signals indicating a phase difference between two points on said flow tube means to which said pick offs are coupled, said meter electronics also receives signals indicating an operating temperature T of said flow tube means from a temperature sensor, said meter electronics comprising:

compensation circuitry that relates said operating temperature T to non-linear temperature compensation information for said material embodying flow tube means, and circuitry that receives said non-linear temperature compensation information, receives said pick offs signals, and applies said non-linear temperature compensation information to generate non-linear temperature compensated fluid flow output information for said Coriolis flowmeter.

Preferably said fluid flow output information includes a non-linear temperature compensated mass flow rate $\dot{M}$ of said material flow.

Preferably said operating temperature T is measured and stored in a memory of said meter electronics.

Preferably said non-linear temperature compensation information for a plurality of operating temperatures is stored in a memory of said meter electronics:

said meter electronics further comprising look-up circuitry that reads said temperature compensation information for said operating temperature T from said memory for use in said defined expression to generate non-linear temperature compensated fluid flow output information for said Coriolis flowmeter.

Preferably said non-linear temperature compensation information comprises measured values of Young's modulus E for a predetermined range of temperatures of said material embodying said flow tube means.

Preferably said non-linear temperature compensation information includes measured values of Young's modulus E for a predetermined range of temperatures of said flow tube means, said meter electronics further includes:

apparatus that generates Young's modulus E for said operating temperature T, and apparatus that uses said determined Young's modulus E in said defined expression that is solved to generate said non-linear temperature compensated fluid flow output information.

Preferably said fluid flow output information includes the non-linear temperature compensated mass flow rate $\dot{M}$ or said fluid flow in said Coriolis flowmeter.

Preferably said Coriolis flowmeter includes:

apparatus that uses said operating temperature T to access the location of said memory storing the value of Young's modulus E corresponding to said operating temperature T, and apparatus that reads said value of Young's modulus E from said memory for use in solving said defined expression.

Preferably said apparatus includes: apparatus that reads the value of E from said accessed location when said operating temperature T corresponds to a location in said memory;

apparatus that determines when a received value of T does not correspond to a location in said memory;

apparatus that determines the location in said memory corresponding to a value of T that is the closest to said received value of T;

apparatus that determines a value of E for said received value of T by interpolating of the value of E for said location having a value of T that is the closest to said received value of T and that uses said interpolated value of T in said defined expression that is solved to generate said non-linear temperature compensated fluid flow output information.

Preferably said meter electronics comprises:

apparatus that stores a non-linear expression for said non-linear temperature compensation information as a function of T, and apparatus that uses said non-linear expression for said non-linear temperature compensation information in said defined expression to generate non-linear temperature compensated flow output information for said Coriolis flowmeter.

Preferably said meter electronics includes:

apparatus that stores a non-linear expression for Young's modulus E as a function of T, and apparatus that uses said non-linear expression for Young's modulus E in said defined expression to generate non-linear temperature compensated fluid flow output information for said Coriolis flowmeter.

Preferably said apparatus that generates said non-linear temperature compensated flow output information includes apparatus that generates a non-linear temperature compensated mass flow rate $\dot{M}$ for said fluid flow.

Preferably said non-linear temperature compensation information includes measured values of Young's modulus E for a range of operating temperatures; said meter electronics further includes;

apparatus that curves fits said measured values of E to obtain said non-linear expression for E expressed as a function of T, and apparatus that uses said non-linear expression for E in said defined expression to generate said non-linear temperature compensated fluid flow output information for said Coriolis flowmeter.

Preferably said measured values of E are stored in a memory of said meter electronics.

Preferably the meter electronics further comprises:

application circuitry in said meter electronics that receives said operating temperature T and said applies said operating temperature T to said expression to generate said temperature compensation information for use in said defined expression to generate non-linear temperature compensated fluid flow output information for said Coriolis flowmeter.

Preferably the meter electronics further comprises:

apparatus that receives data including Young modulus E for each of a plurality of temperatures and performs an n order curve fit for said values of Young's modulus E to generate an expression for use in determining said temperature compensation output information wherein n is greater than 1.

Preferably said meter electronics comprises:

circuitry that generates a second order form fit of said values of Young's modulus E to generate said expression for determining said non-linear temperature compensated fluid flow output information for said Coriolis flowmeter.

Preferably said meter electronics comprises:

circuitry that generates a third order form fit of said values of Young's modulus E to generate said expression for determining said non-linear temperature compensated fluid flow output information for said Coriolis flowmeter.

Preferably said meter electronics comprises:

circuitry that generates a fourth order form fit of said values of Young's modulus E to generate said expression for determining said non-linear temperature compensated fluid flow output information for said Coriolis flowmeter.

Preferably said meter electronics comprises circuitry that generates a fifth order form fit of said values of Young's modulus E to generate said expression for determining said non-linear temperature compensated fluid flow output information for said Coriolis flowmeter.

Preferably the Coriolis flowmeter further includes:

apparatus that receives fluid flow output information containing linear temperature compensation for Young's modulus E of material embodying a flow tube means of said Coriolis flowmeter;

apparatus that receives the operating temperature T of said Coriolis flowmeter;

apparatus that removes said linear temperature compensation from said output information of said Coriolis flowmeter to provide an uncompensated fluid output flow information for said Coriolis flowmeter;

apparatus that uses said defined expression relating said operating temperature T to said non-linear temperature compensation information, and apparatus that solves said defined expression to generate non-linear temperature compensated fluid flow output information for said Coriolis flowmeter at said operating temperature T.

Preferably said stored non-linear temperature compensation information includes a plurality of non-linear expressions for Young's Modulus E expressed as a function of operating temperature T, said meter electronics further includes;

apparatus said receives said operating temperature T;

apparatus that uses said received operating temperature T to select one of said plurality of non-linear expressions;

apparatus that uses said selected non-linear expression for E in said defined expression to generate said non-linear temperature compensated flow output information for said Coriolis flowmeter.

DRAWINGS

The above and other advantages and aspects of the invention may be better understood from the reading of the following description thereof taken in conjunction with the drawing in which:

FIG. 1 discloses a Coriolis flowmeter embodying the present invention.

Figure 2:
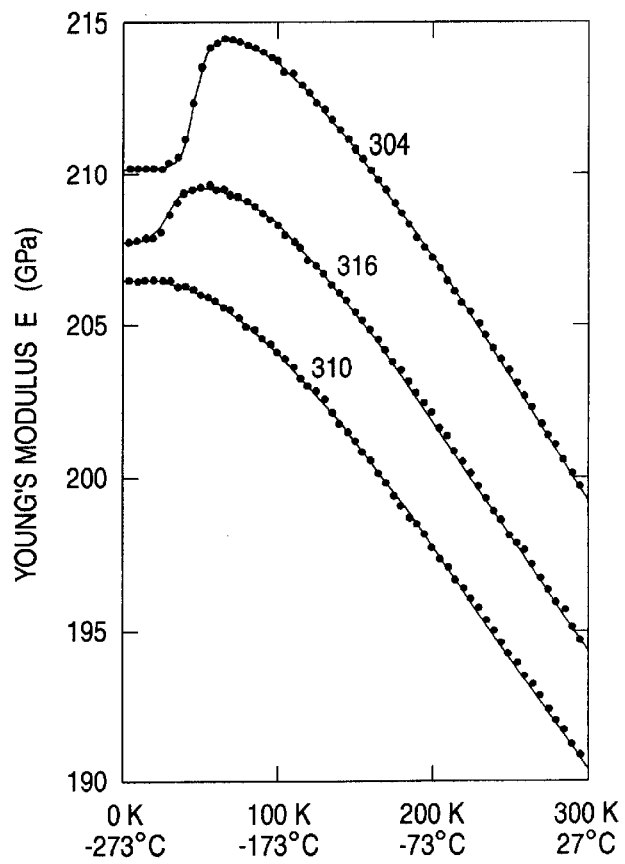

FIG. 2 illustrates curves of measured values of Young's Modulus E for different grades of stainless steel.

Figure 3:
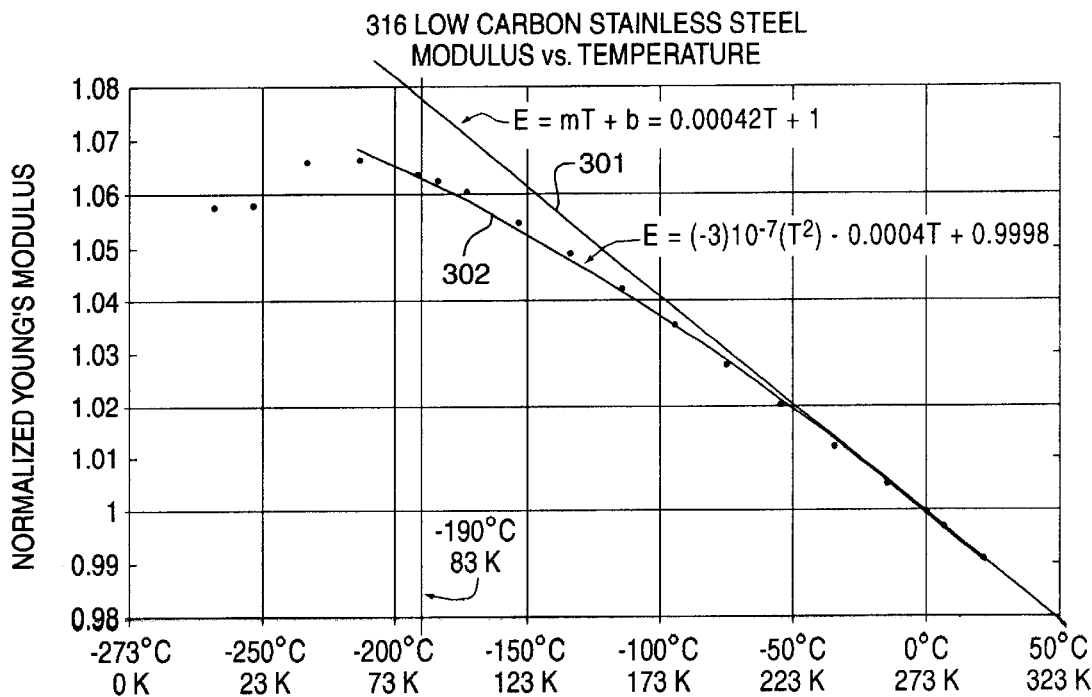

FIG. 3 discloses curves representing curves of measured values of Young's Modulus E defined by a first order linear expression as well as by a second order non-linear expression.

Figure 4:
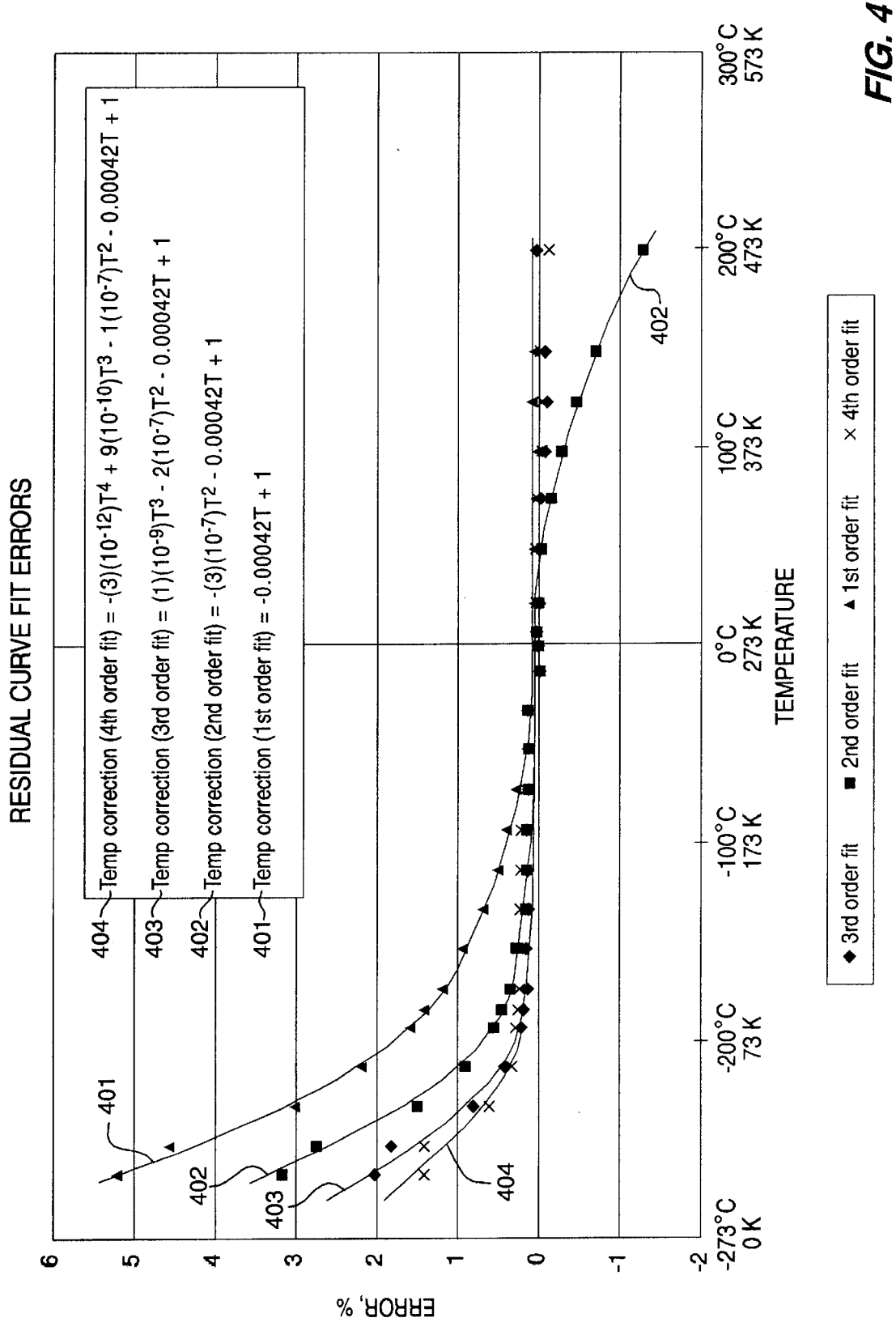
Figure 5:
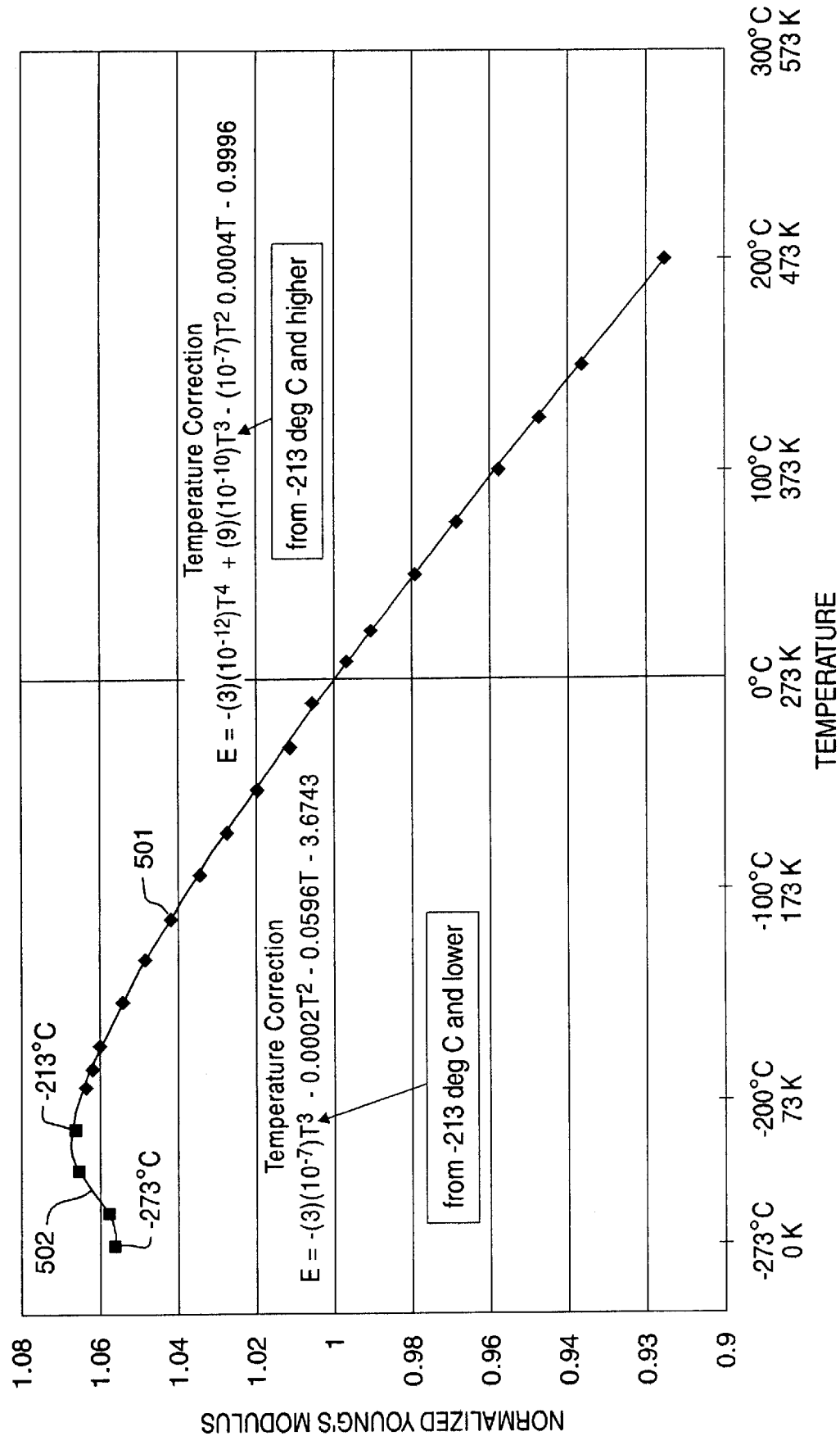

FIGS. 4 and 5 disclose curves of values of Young's Modulus E defined by a linear expression as well as a plurality of higher order non-linear expressions.

Figure 6:
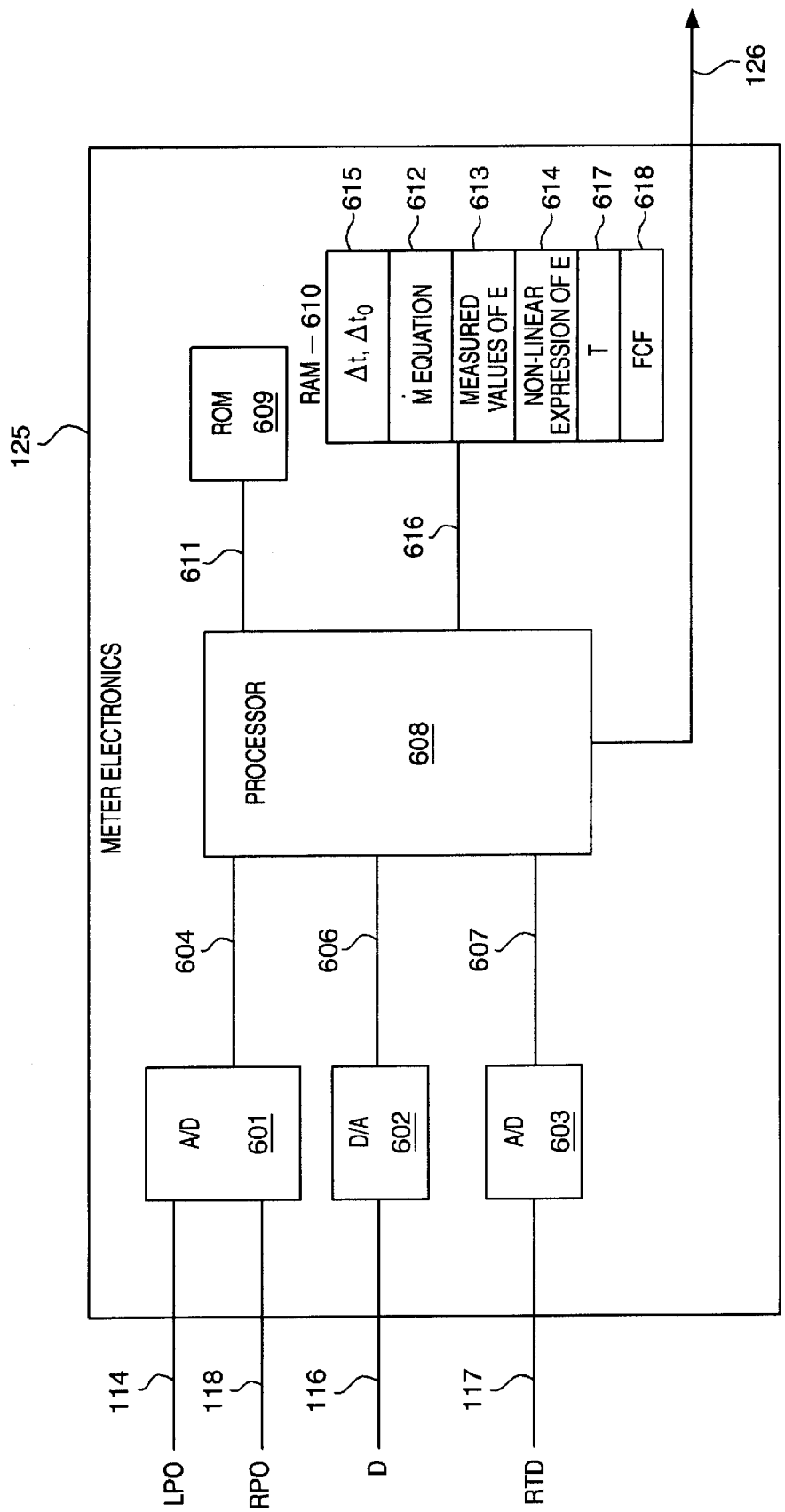

FIG. 6 discloses further details of meter electronics 125 of FIG. 1.

Figure 7:
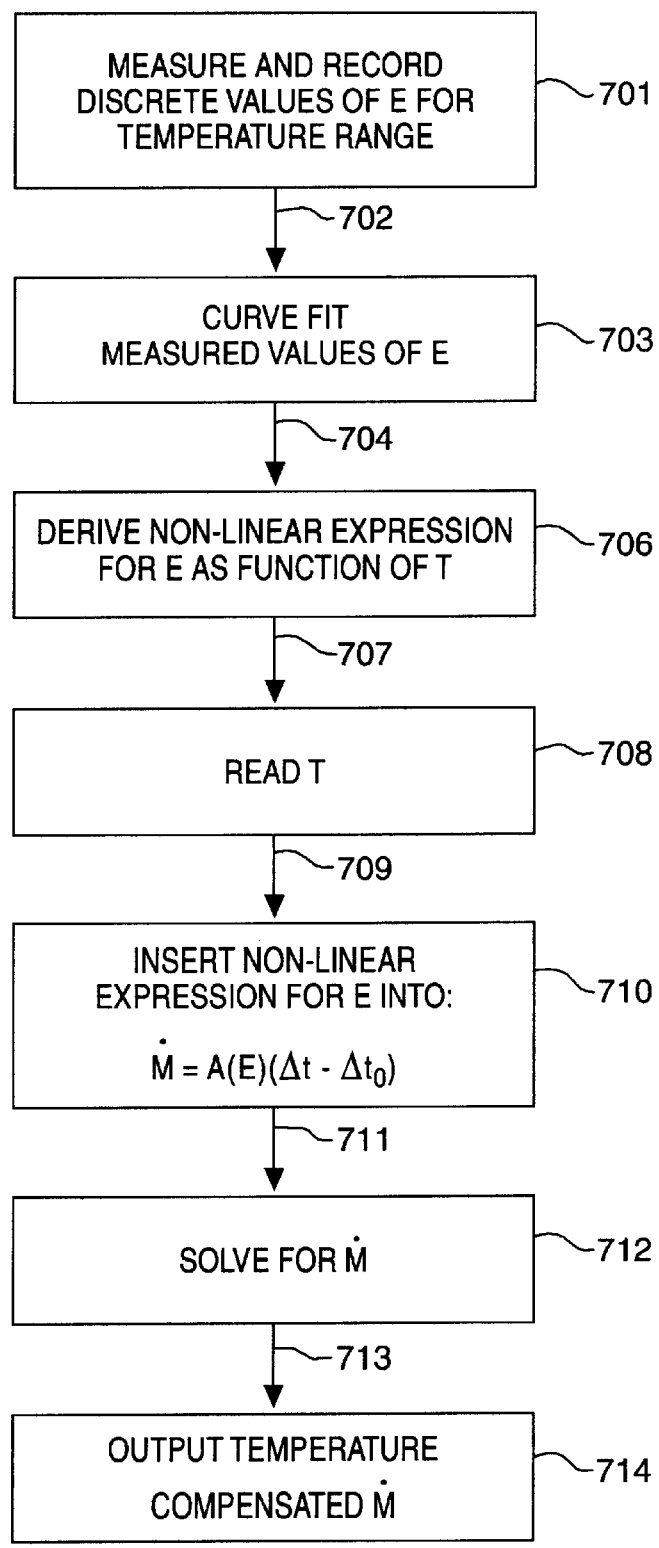
Figure 8:
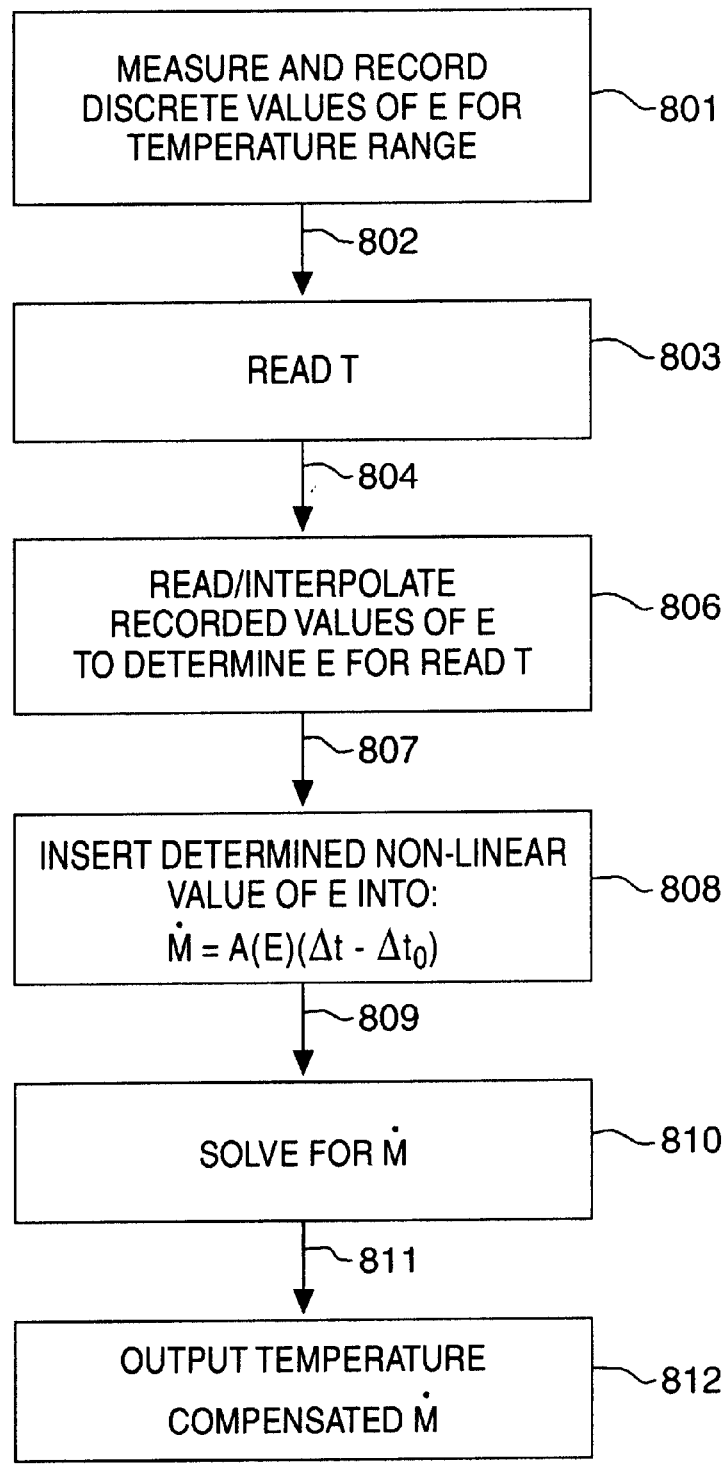
Figure 9:
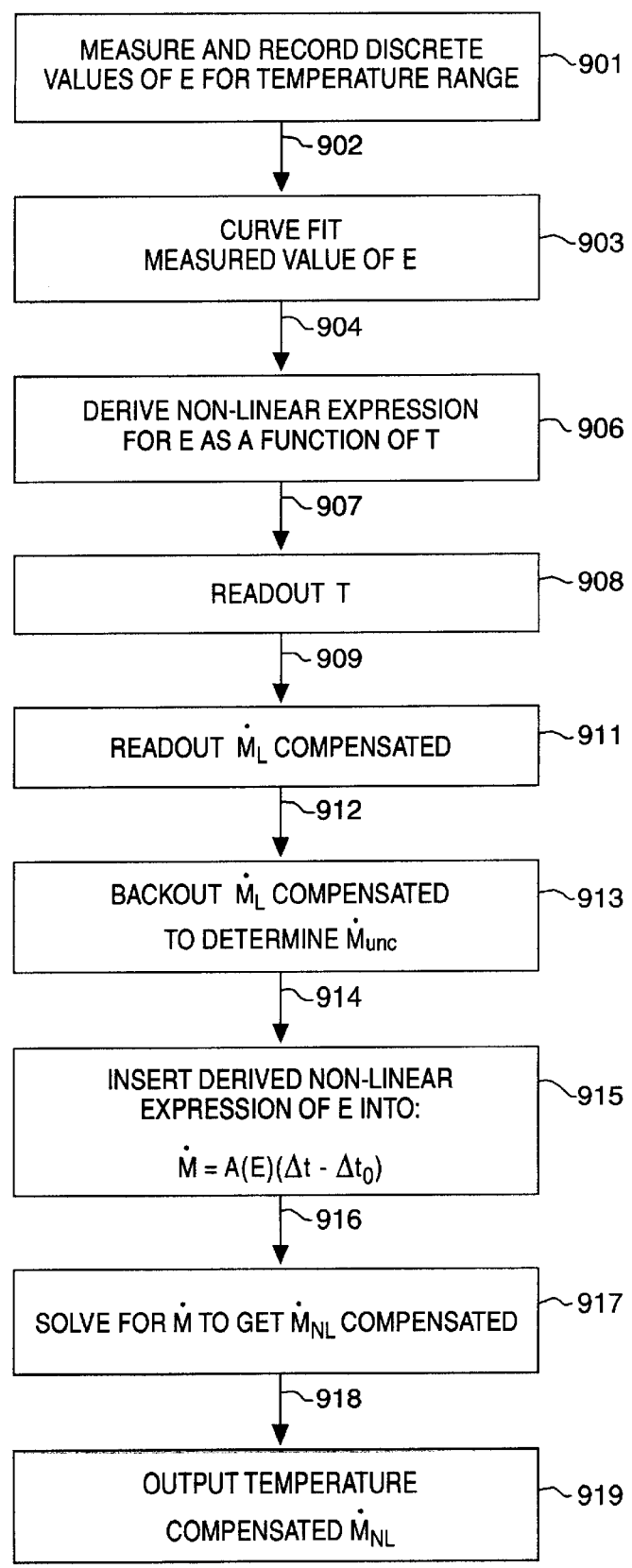

FIGS. 7, 8, and 9 are flow charts of the method and apparatus alternative embodiments of the present invention.

DETAILED DESCRIPTION

Description of FIG. 1

FIG. 1 illustrates a Coriolis flowmeter 100 and associated meter electronics 125. Coriolis flowmeter 100 is connected to meter electronics 125 via leads 114, 116, 117, and 118 to provide density, mass flow rate, volume flow rate, totalized mass flow, temperature, and other information over output path 126. It should be apparent to those skilled in the art that the present invention can be used by any type of Coriolis flowmeter regardless of the number of drivers, the number of pick off sensors, the operating mode of vibration.

Coriolis flowmeter 100 includes a pair of flanges 109 and 111; driver D pick offs LPO and RPO and flow tubes 101 and 102. Driver D and pick offs LPO and RPO are coupled to flow tubes 101 and 102.

Flanges 109 and 111 are affixed to manifolds 110 and 115. Manifolds 110 and 115 are affixed to opposite ends of spacer 106 which maintains the spacing between manifolds 110 and 115 to prevent undesired vibrations in flow tubes 101 and 102. When Coriolis flowmeter 100 is inserted into a pipeline system (not shown) which carries the material being measured, material enters Coriolis flowmeter 100 through flange 109, passes through inlet manifold 110 where the material flow is directed to flow tubes 101 and 102, flows through flow tubes 101 and 102 and back into outlet manifold 115 where it exits Coriolis flowmeter 100 through flange 111.

Flow tubes 101 and 102 are selected and appropriately mounted to plates 107A and 107B to have substantially the same mass distribution, moments of inertia, and elastic modules about bending axes W—W and W'—W' respectively. The flow tubes extend outwardly from the manifolds in an essentially parallel fashion.

Flow tubes 101 and 102 are driven by driver D in phase opposition about their respective bending axes W and W' and at what is termed the first out of bending mode of the flowmeter. Driver D may comprise any one of many well known arrangements, such as a magnet mounted to flow tube 101 and an opposing coil mounted to flow tube 102. An alternating current is passed through the opposing coil to cause both tubes to oscillate in phase opposition. A suitable drive signal is applied by meter electronics 125 via path 116 to driver D. The description of FIG. 1 is provided merely as an example of the operation of a Coriolis flowmeter and is not intended to limit the teaching of the present invention.

Meter electronics 125 receives the right and left velocity signals appearing on paths 114 and 118 from pick offs LPO and RPO, respectively. Meter electronics 125 produces a drive signal on path 116 which causes driver D to oscillate flow tubes 101 and 102 in phase opposition. The present invention as described herein, can produce multiple drive signals for multiple drivers. The material flow through the vibrating flow tubes 101 and 102 produces a Coriolis response in the flow tubes which is detected by left pick off LPO and right pick off RPO. The signals from the two pick offs have a phase difference proportional to the magnitude of the material flow. The output information of the pick off is applied over conductors 114 and 118 to meter electronics 125 which processes the received information and extends output information over path 126 pertaining to the material flow including the mass flow rate.

Thermal sensor RTD detects the temperature of the flow tubes and extends this temperature information over path 117 to meter electronics which uses the temperature information to compensate the mass flow rate output data generates in response to the phase difference information from pick offs LPO and RPO over paths 114 and 118. It is necessary that the temperature information provided over path 117 be utilized in a mass flow rate determination so that the mass flow rate determination will be of the required 0.10% accuracy.

It is often assumed that the generated mass flow rate changes linearly with temperature. This assumption is correct only for a limited range of temperatures. At cryogenic temperatures the effect of temperature changes on mass flow rate calculations is not linear. A Coriolis flowmeter calculation that assumes a linear change for cryogenic temperatures will have a mass flow measurement that is in error by approximately 1.5% at −190° C. rather than the desired 0.10% accuracy. The apparatus and method provided in accordance with the present invention permits the output data of a Coriolis flowmeter to have an acceptable accuracy of 0.10% over a wide range of temperature changes including cryogenic temperatures.

Description of FIG. 2

FIG. 2 is a plot of measured values of Young's Modulus E versus temperature for three grades of stainless steel, namely 304, 310, and 316. These data are from an article entitled *Stainless Steel Elastic Constance at Low Temperatures* by H M Ledbetter in the *Journal of Applied Physics*, March 1981. The temperatures are shown on the abscissa in both Kelvin and centigrade. The ordinate represents the value of Young's Modulus E in giga pascal (a pascal equals one newton per square meter). The change of Young's Modulus E with temperature is essentially linear for 316 stainless steel over a range of 100 k to 300 k. It can also be seen that the change in Young's Modulus E becomes non-linear at temperatures below 100 k.

The measured values of Young's Modulus E upon which FIG. 2 is based are shown in table 1.

Description of Table 1

TABLE 1

Elastic constants of three stainless steels at selected temperatures.

| T (K) | E (GPa) |
|---|---|
| Stainless 304 | |
| 295 | 199.6 |
| 280 | 200.9 |
| 260 | 202.5 |
| 240 | 204.1 |
| 220 | 205.6 |
| 200 | 207.1 |
| 180 | 208.6 |
| 160 | 210.0 |
| 140 | 211.3 |
| 120 | 212.6 |
| 100 | 213.7 |
| 80 | 214.2 |
| 60 | 214.3 |
| 40 | 211.0 |
| 20 | 210.1 |
| 5 | 210.1 |
| Stainless 310 | |
| 295 | 190.8 |
| 280 | 191.9 |
| 260 | 193.4 |
| 240 | 194.9 |
| 220 | 196.2 |
| 200 | 197.6 |
| 180 | 199.0 |
| 160 | 200.4 |
| 140 | 201.6 |
| 120 | 202.8 |
| 100 | 203.9 |
| 80 | 204.8 |
| 60 | 205.7 |
| 40 | 206.2 |
| 20 | 206.4 |
| 5 | 206.4 |
| Stainless 316 | |
| 295 | 194.6 |
| 280 | 195.8 |
| 260 | 197.5 |
| 240 | 198.8 |
| 220 | 200.4 |
| 200 | 201.9 |
| 180 | 203.3 |
| 160 | 204.7 |
| 140 | 206.0 |
| 120 | 207.1 |
| 100 | 208.2 |
| 80 | 209.0 |
| 60 | 209.4 |
| 40 | 209.3 |
| 20 | 207.8 |
| 5 | 207.7 |

Table 1 sets forth the measured values of the elastic constants of Young's Modulus E for the three stainless steels of FIG. 2 at selected arbitrary temperatures. The left column represents temperature in K. The right column represents the composite Young's Modulus E in giga pascal.

The Coriolis flowmeters heretofore available perform a temperature compensation of Young's Modulus E and, in turn, a mass flow rate computation using the assumption that variation of E with temperature is linear. FIG. 2 shows that this assumption is true only for a limited range of temperatures those between approximately 100 k and 300 k. A Coriolis flowmeter using these assumptions produces output data having an unacceptable accuracy for cryogenic temperatures. The method and apparatus of the present invention employs a high order non-linear curve fitting for the data of table 1 and FIG. 2 to produce a non-linear expression of values of Young's Modulus E that is accurate over a wide range of temperatures including those in the cryogenic range down to 15 k as well as those ranging up to 300 k or higher.

Mass Flow Measurement

The following describes the process used for the calculation of the mass flow rate $\dot{M}$. Mass flow rate $\dot{M}$ for a Coriolis flowmeter may be expressed as $$\dot{M}=A(E_T)(\Delta t-\Delta t_0) \qquad \text{Eq. 1}$$

Where

A=A Coriolis flowmeter constant based on meter geometry $E_T$=Young's Modulus E as a function of temperature $\Delta t$=Measured time delay of pick offs during material flow $\Delta t_0$=Measured time delay of pick offs at 0 material flow Young's Modulus $E_T$ at 0° C. is a constant having a normalized value of 1. E at any temperature may be expressed as $$E_T=E_{0C.°}(1-0.00042\ T) \qquad \text{Eq. 2}$$

This expression provides linear temperature compensation for Young's Modulus E.

Where:

T=temperature

The mass flow rate $\dot{M}$ of Eq. 1 may then be expressed as $$\dot{M}=AE_{0C.°}(1-0.00042\ T)(\Delta t-\Delta t_0) \qquad \text{Eq. 3}$$

Since the value of Young's Modulus $E_{0°\ C.}$ is a constant, both of the terms $E_{0°\ C.}$ and A are each a constant and may be combined and termed FCF for meter flow calibration factor. Thus, the mass flow rate $\dot{M}$ of equation 3 may be expressed as $$\dot{M}=FCF(1-0.00042\ T)(\Delta t-\Delta t_0) \qquad \text{Eq. 4}$$

The part of equation 4 that provides linear temperature compensation for the $\dot{M}$ is (1−0.00042 T). This term represents the Young's Modulus E at any temperature T and it compensates the $\dot{M}$ determination for linear changes in Young's Modulus E versus temperature. The constant −0.00042 is a measured value derived from laboratory measurement and calculates the best fit coefficient for the first order linear value of T as represented by curve 301 on FIG. 3. This term is derived from tests on water and Dow Therm at temperatures from 5° C. to 400° C.

As a check on the accuracy of this number, the measured values for Young's Modulus E in table 1 can be used to verify the accuracy of the coefficient −0.00042. This is done as follows:

$E_{295\ k}$=194.6 GPa $E_{260\ k}$=197.5 GPa $E_{273\ k}$=196.36 GPa $$\text{Temperature coefficient}=\frac{\frac{E_{295}-E_{260}}{E_{273}}}{295-260}=-0.000422\ \text{per}\ °\ \text{C.} \qquad \text{Eq. 5}$$

In the present application, all values of Young's Modulus E are normalized and referenced to value of Young's Modulus E at 0° C. This is shown as described for FIG. 3. The above value of 0.00042 of equation 7 checks closely with the experimentally derived value of −0.0042 of equations 4, 5, and 6. Some variation of this value can be expected due to material variation from one Coriolis flowmeter to the next. The published value of −0.00042 may be considered to be the average of a plurality of tested Coriolis flowmeters.

Determination of E at Cryogenic Temperatures

To evaluate the effect of cryogenic temperatures on the output information provided by Coriolis flowmeters, it is useful to know what the predicted Young's Modulus E is using the linear compensation expression of Eq. 6 versus the actual measured values of table 1. By interpolating the pertinent values of table 1, Young's Modulus E at 273 k we find that $E_{273\ k}$=196.36 GPa This is the value of Young's Modulus E at 0° C.

Using Eq. 6, Young's Modulus E may be calculated as:

$$E_T=E_{273\ k}\times(1-0.00042\ T) \qquad \text{Eq. 6}$$

Using laboratory data from an operating Coriolis flowmeter having linear compensation for a material temperature in the cryogenic range of −184° C.: From equation 8, E at −184° C. may be expressed as:

$$E_{-184°\ C.}=196.3\ 6\times[1-(0.00042)(-184)] \qquad \text{Eq. 7}$$

Where:

196.36 GPa=$E_{273\ k}$

Solving equation 7 one gets:

$$E_{89\ k=-184°\ C.}=211.53\ \text{GPa} \qquad \text{Eq. 8}$$

However, by interpolating from table 1, the value of E at 89°k is:

$$E_{89\ k}=208.6\ \text{GPa} \qquad \text{Eq. 9}$$

Thus, the conventional measurement technique using the linear expression of equation 8 for Young's Modulus produces a value of E of 211.53 GPa that is +1.5% in higher than the measured value 208.6 GPa of table 1 in its estimates for Young's Modulus E at the cryogenic temperature of −184° C. This is shown by the following:

$$\text{Young's Modulus error}=\frac{211.53-208.6}{208.6}\times 100\%=+1.5\% \qquad \text{Eq. 10}$$

In a constant temperature application, an erroneous value of E at cryogenic temperatures could be compensated by adjusting the flow calibration factor FCF. This is done by simply reducing the measured value by 1.5% to correct the Coriolis flowmeter output data. However, the apparatus and process of the present invention is a preferable and may be used to determine a value of Young's Modulus E having the required 0.10% accuracy over a wide temperature range including cryogenic temperatures.

The apparatus and method of the present invention accurately determines the Young's Modulus E at any temperature including cryogenic temperatures. It does this by applying non-linear curve fitting to the data of table 1. This curve fitting may involve the use of expressions of a second order, third order, a fourth order or higher as required to obtain an expression that produces output data having the required accuracy of 0.10% at cryogenic temperatures.

Description of FIG. 3

First and second order expressions for Young's Modulus E are shown in FIG. 3 on which temperatures are shown along the abscissa and Young's Modulus E is shown on the ordinate in a normalized format. The data on FIG. 3 has been normalized to the value of Young's Modulus E at 0° C. (273 k). Thus, the ordinate having a value of 1 intersects the abscissa at 0° C. The value of Young's Modulus E for 316 stainless steel at 0° C. (273 k) is 196.36 gaga pascal on table 1. Other points on the ordinate, such as 1.04, intersects curves 301 and 302 on FIG. 3 at the points on curves for the temperatures at which the value of Young's Modulus E is 1.04 times the value of the Young's Modulus E at 0° C.

FIG. 3 discloses the Young's Modulus E expressions (normalized) obtained from the use of the conventional linear expression (curve 301) as well as from a second order curve fitting curve (302) of the data of table 1. Curve 301 is a straight line having:

$$E = MT + B \qquad \text{Eq. 11}$$

M=The slope of line 301

T=The operating temperature

B=The intersection of line 301 on the ordinate at the 0° C. abscissa Line 301 intersects the ordinate at a value of 1 for 0° C.

T is the operating temperature and the slope of line 301 is −0.00042. The equation for line 301 may be expressed as $$E = -0.00042\ T + 1 \qquad \text{Eq. 12}$$

Young's Modulus E may be determined by inserting the operating temperature T in equation 14. The results obtained for different temperatures define the straight line 301. Line 301 is coincident with the data dots on FIG. 3 representing the actual data of table 1 from approximately −50° C. to +50° C. For temperatures lower than −50° C. it can be seen that the vertical spacing between line 301 and the plotted data represent an error that increases with decreasing temperatures. At −190° C., the plotted data indicates a relative Young's Modulus E of approximately 1.063 while line 301 indicates a relative Young's Modulus E of approximately 1.078. This is an unacceptable error.

Curve 302 is the expression obtained for a second order curve fitting of the data of table 1. This expression is $$E = -(3)(10^{-7})T^2 - 0.00042\ T + 1$$

Curved 302 is a more accurate representation of the value of Young's Modulus E over a wider range of temperatures than is curve 301. Curve 301 is coincidence with the data dots of table 1 for Young's Modulus E only over a range of about −50° C. to +50° C. At lower temperatures, the difference between curve 301 and the data representing the measured value of Young's Modulus E is in error by increasing amounts beginning with temperatures below −50° C. Thus, a flowmeter using the curve 301 for temperature compensation at a temperature of 83 k would produce output data that is in error by the value of approximately 1.078/1.062=1.015 or by 1.5% times the value of Young's Modulus E at 0° C. This error is too high.

Curve 302 is non-linear and is essentially coincident with the data of table 1 over a temperature range from 50° C. down to −190° C. A flowmeter using the polynomial expression for curve 302 in its temperature compensation would produce output data of an acceptable accuracy for Coriolis flowmeter temperatures down to approximately −190° C. Over this range, the flow information and other data generated by a Coriolis flowmeter using the expression shown for curve 302 will have the required accuracy of 0.10%.

Description of FIG. 4

FIG. 4 contains graphs of the expressions for Young's Modulus E for a linear first order fit of the data of table 1 as well as graphs of the expressions of non-linear second order, third order and fourth order fits.

The expressions of the curves 401, 402, 403, and 404 are:

Curve 404=Temp correction ($4^{th}$ order fit)=−(3)($10^{-12}$) $T^4$+9($10^{-10}$)$T^3$−1($10^{-7}$)$T^2$−0.00042 T+1

Curve 403=Temp correction ($3^{rd}$ order fit)=(1)($10^{-9}$) $T^3$−2($10^{-7}$)$T^2$−0.00042 T+1

Curve 402=Temp correction ($2^{nd}$ order fit)=−(3)($10^{-7}$)$T^2$−0.00042 T+1

Curve 401=Temp correction ($1^{st}$ order fit)=−0.00042 T+1

Curve 401 represents the expression for the linear first order fit and it produces an acceptable error for temperatures of −50° C. and higher. Curve 401 has an error that increases exponentially beginning at about −50° C. and lower. At cryogenic temperatures of −250° C. or lower, the error for curve 401 is greater than 5%.

Curve 402 represents the expression for the non-linear second order fit and it produces reasonably accurate data for temperatures of approximately −120° C. and higher. Below this temperature, the error for curve 401 rises exponentially and at temperature of approximately −250° C. produces an error of greater than 3%.

Curve 403 represents the expression for the non-linear third order fit. This third order fit produces data having an acceptable accuracy down to about approximately −200° C. Below this temperature its error is unacceptable and increases to 2% at about −250° C.

Curve 404 represents a non-linear expression for the fourth order fit. This expression produces good data down to approximately −200° C. and then rises sharply to produce an error greater than 1% at approximately −250° C. In practice, the expression that would be used in a given application would be determined by the operating temperatures at which it is desired to operate the Coriolis flowmeter. In order to minimize the complexity, it is to be expected that the expression of the lowest order would be used that provides output data of an acceptable accuracy. Thus, the first order linear expression could be used for temperatures of 0° C. and higher. The second order fit of curve 202 would be used for slightly lower temperatures and so on for the third and fourth order fits which are adapted to provide output data of the best possibly accuracy for colder temperatures.

Description of FIG. 5

FIG. 5 discloses non-linear expressions that provides non-linear temperature compensation for lower temperatures than the expressions on FIG. 4. The expressions on FIG. 4 produce an unacceptable error at temperatures below −200° C. This shown on FIG. 3 where the data points for temperatures lower than −200° C. are not included on curve 302. Similarly, the non-linear expressions 402, 403, and 404 on FIG. 4 produce an unacceptable error at temperatures below −200° C. The data points on FIG. 4 below −200° C. for these expressions represent unacceptable errors.

However, 99.9% of all applications of Coriolis flowmeters have operating temperatures greater (higher) than −200° C. Thus, expressions 402, 403, and 404 could be used to provide non-linear temperature compensation of acceptable accuracy for 99.9% of all applications of Coriolis flowmeters. The specific expression used would depend upon the operating temperature T for each application. The expressions of FIG. 5 would only be required for temperatures of less than −213° C. This would include applications involving liquid hydrogen, helium, and neon. These applications would represent only 0.1% of all applications of Coriolis flowmeters. Curves 501 and 502 on FIG. 5 represents values of E for the range from −273° C. on the left to +200° C. on the right. The curve of FIG. 5 has two segments. The first segment is 502 and it includes the temperature range of −273° C. to −213° C. The second segment is 501 and it includes the temperature range of −213° C. to 200° C. on the right. Segment 502 represents the derived third order expression.

$$E = -(3)(10^{-7})T^3 - 0.0002\ T^2 - 0.0596\ T - 3.6743$$

This expression represents the values of E for the temperature range of −273° C. to −213° C. Curve segment 502 is an accurate representation of the values of Young's Modulus E in this temperature range since the data points of table 1 for this temperature range were used in the curve fitting operation that derived the expression for segment 502.

Curve segment 501 covers the data points in the range of −213° C. up to +200° C. The non-linear fourth order equation contain from the curve fitting of these data point is shown in the right side of FIG. 5 and is the same as expression for curve 404 on FIG. 4. Curve segments 501 and 502 together provide an accurate representation of the compensation of Young's Modulus E for the entire range of −273° C. up to +200° C. In use, the value of the operating temperature T for the Coriolis flowmeter would be determined. If the value of T was in the range of −273° C. to −213° C., the third order expression of segment 502 would be used. If the value of T ranged higher from −213° C. or higher, the fourth order expression of curve segment 501 would be used. Together, these two curve segments permit a temperature compensated value of Young's Modulus E to be obtained for a temperature range of −273° C. to +200° C. with an error of no greater than approximately 0.10%. This may be verified in the same manner as for FIG. 4 by substituting values of T into the expressions for curve segments 501 and 502 and by then comparing the results obtained with the data of table 1.

The use of the curve of FIG. 5 requires that the meter electronics 125 store the expression for both curve segments 501 and 502 and that the operating temperature T of the Coriolis flowmeter be determined and used to select which one of the two stored expressions is to be used in the generation of the non-linear temperature compensated mass flow rate $\dot{M}$ for the determined operating temperature T.

Description of FIG. 6

FIG. 6 discloses further details of the meter electronics element 125 of FIG. 1. On FIG. 6, meter electronics 125 is shown as comprising processor 608, read only memory (ROM) 609, a random access memory (RAM) 610, A to D convertors 601, 603, and a D to A convertor 602. A to D convertor 601 receives signals from left pick off LPO over path 114 and from right pick off RPO over path 118. A to D convertor 601 converts these signals from analog to digital and extends the resultant digital information over path 604 to processor 608. A to D convertor 603 receives temperature information from the RTD element over path 117, converts this information from analog to digital and extends the digital output over path 607 to processor 608. D to A convertor receives a digital drive signal over path 606 from processor 608, converts it to analog and extends an analog drive signal over path 116 to driver D to vibrate the flow tubes 101 and 102 in phase opposition.

Processor 608 may comprise a micro processor, an array of processors, or whatever processing capability that is required to perform the functions of meter electronics 125. Processor 608 is connected over path 611 to ROM 609 which stores permanent data and programming information required by processor 608 in the performance of its functions. RAM 610 has a plurality of segments that store volatile information including program information, volatile data and other volatile information that may be required by processor 608 in the performance of its functions. This information includes the $\Delta t$, and $\Delta t_0$ stored in segment 615; the $\dot{M}$ equation information stored in segments 612; the measured value of Young's Modulus E is stored in segment 613; the non-linear expression(s) derived for Young's Modulus E is stored in segment 614, the operating temperature T is stored in segments 617; and the flow calibration factor FCF is stored in segment 618.

The method and apparatus of the present invention can function in a number of alternative ways. There are at least three possible exemplary alternative embodiments. In a first embodiment subsequently described for FIG. 7, the measured values of E of table 1, are stored and subsequently used in a curve fitting operation to derive an expression(s) of Young's Modulus E as a function of T. In such cases, the measured values of E are stored in segment 613 and are used in connection with the segment 614 which stores one or more non-linear expressions for E. In an alternative application as shown in FIG. 8, curve fitting of the measured data of table 1 is not used and instead, the data stored in segment 613 is used on a table look up basis to a value of E for use in equation 1. Interpolation is used to determine Young's Modulus E for intermediate temperatures not explicitly contained within the stored data of segment 613. In the alternative shown in FIG. 9, the data stored in segment 612 and 613 is used for a curve fitting operation which is applied to the output linear compensated data of an existing Coriolis flowmeter to correct it's generated mass flow rate to provide a corrected non-linear temperature compensated mass flow rate. In other applications, the measured value of E stored in segment 613 is not required and instead the applicable non-linear expression of E that is to be used is derived independently of the flowmeter and is stored in segment 614. This derived equation or expression is then subsequently used as priorly described to derive a temperature compensated mass flow rate.

Processor 608 interacts with the elements to which it is connected including ROM 609 and RAM 610 to perform the functions required of it including the generation of Young's Modulus E information for the operating temperature of the Coriolis flowmeter and the use of this generated Young's Modulus E information in the mass flow determination. The resultant output information generated by processor 608 is extended over path 126 to a data utilization circuit (not shown) which responds to the receipt of this output information and performs the system functions required of the data utilization circuit.

It has been described how the measured Young's Modulus E information of table 1 is subjected to a non-linear curve fit to generate expressions which may be used as the value of E in equation 1 to provide accurate values of Young's Modulus E for a wide range of temperatures down to and including cryogenic temperatures. It is not necessary that the data of table 1 be converted to algebraic form by non-linear curve fitting operations. Instead, the data of table 1 can be used on a table look-up basis to provide Young's Modulus E information for use in equation 1. This information of table 1 may also be used for measured temperatures not specifically indicated on table 1. This involves a process of extrapolation that uses values of Young's Modulus E at a higher and lower temperature than the measured temperature as well as the values of E for these temperatures. Young's Modulus E for the measured temperature may then be obtained by interpolating the measured temperature between the adjacent higher and lower temperatures. Thus, Young's Modulus E is shown in table 1 for 316 steel for temperatures of 40 k and 60 k. If the operating temperature is 50 k, the Young's Modulus E for the temperature 50 k may be obtained by extrapolation by determining the difference between the value of E for 60 k and the value of E for 40 k, and then by adding one half of this difference to the value of E for 40 k to arrive at an accurate value of E for 50 k.

Description of FIG. 7

FIG. 7 describes the method and apparatus embodying a first possible exemplary embodiment of the invention. In step 701, the data shown in table 1 is measured and recorded in RAM 610 for the temperature range of interest. This data is subject to a curve fitting operation in step 703 for the measured value of Young's Modulus E of step 701. The data of step 703 is used in step 706 to derive a non-linear expression for Young's Modulus E as a function of temperature. The temperature is read in step 708. In step 710 the non-linear expression for E is inserted into the $\dot{M}$ used to derive a temperature compensated mass flow rate. In step 712, the mass flow rate is determined by solving the expression shown in step 710, in step 714 the meter electronics 125 outputs the derived temperature compensated mass flow rate over path 126 to a utilization circuit not shown. If desired, steps 701 and 703 may be done off-line with derived expression being stored in RAM 610 for use in step 710.

Description of FIG. 8

FIG. 8 discloses a method and apparatus in which curve fitting is not used and instead, the applicable Young's Modulus E is derived on a table look up basis for the data stored in segment 613 of RAM 610. The process begins in step 801 in which the discrete measured values of E of table 1 for the temperature range of interest are received by or recorded in RAM 610. The temperature is read in step 803. The temperature of step 803 is used to access the data recorded by step 801. If this temperature coincides with a stored temperature of table 1, the applicable Young's Modulus E is directly determined. If the temperature in step 803 does not coincide exactly with a stored temperature of table 1, and interpolation process is used to determine the applicable Young's Modulus E. The Young's Modulus E determined in step 806 is that inserted into the $\dot{M}$ mass flow rate equation shown in step 808. The equation of step 808 is solved in step 810 to derive the temperature compensated mass flow rate. This temperature compensated mass flow rate is outputted by meter electronics in step 812 over path 126 to a utilization circuit not shown.

Description of FIG. 9

FIG. 9 disclose a method and apparatus in accordance with which the linear compensated mass flow rate for an existing Coriolis flowmeter is received and is processed to derive a non-linear temperature compensated mass flow rate. The process begins in step 911 in which the data of table 1 is entered into RAM segment 613. This data is then subject to a curve fitting operation in step 903 to derive a non-linear expression for E as a function of temperature T in step 906. The temperature T is read out of the RAM segment 617 in step 908. The linear compensated mass flow rate output of the flowmeter is received in step 911. In step 913 the compensated mass flow rate of step 911 is subject to an operation in which the linear compensation is removed to determine an uncompensated mass flow rate for the flowmeter. The derived non-linear expression of step 906 is inserted into the mass flow rate expression of step 915 to provide for temperature compensation. In step 917, the mass flow rate equation of step 915 is solved to derive a temperature compensated mass flow rate for the Coriolis flowmeter. This temperature compensated mass flow rate is then outputted by the Coriolis flowmeter in step 919 over path 126 to a utilization circuit not shown.

The linear compensation is removed and the non-linear compensation added by use of the following processing steps and expressions:

$$\dot{M} \text{ linear} = \dot{M}_L = AE_L(\Delta t - \Delta t_0) \qquad \text{Eq. 14}$$

$$\dot{M} \text{ non-linear} = \dot{M}_{NL} = AE_{NL}(\Delta t - \Delta t_0) \qquad \text{Eq. 15}$$

$$A(\Delta t - \Delta t_0) = \frac{\dot{M}_L}{E_L} \qquad \text{Eq. 16}$$

$$A(\Delta t - \Delta t_0) = \frac{\dot{M}_{NL}}{E_{NL}} \qquad \text{Eq. 17}$$

$$\frac{\dot{M}_L}{E_L} = \frac{\dot{M}_{NL}}{E_{NL}} \qquad \text{Eq. 18}$$

$$\dot{M}_{NL} = \dot{M}_L\left(\frac{E_{NL}}{E_L}\right) = \dot{M}_L\left(\frac{\text{derived non-linear expression}}{1 - 0.00042T}\right) \qquad \text{Eq. 19}$$

In the above, $\dot{M}_L$ is the linear compensated $\dot{M}$ of the flowmeter; $E_{NL}$ is the curve fitted non-linear expression to be used; and (1–0.00042 T) is the linear compensation to be removed.

It is to be expressly understood that the claimed invention is not to be limited to the description of the preferred embodiment but encompasses other modifications and alterations within the scope and spirit of the inventive concept. For example, although the present invention has been disclosed as comprising a part of a dual curved tube Coriolis flowmeter, it is to be understood that the present invention is not so limited and may be used with other types of Coriolis flowmeters including single tube flowmeters of straight, irregular or curved configuration. Also the corrected value of E shown herein may be used in other flowmeter calculations, such as a density determination. Also, the data of table 1 need not be stored in RAM 610. It could be stored off-line and used as needed on a retrieval basis. The curve fitting of the data of table 1 could be done off-line or on line. Curve filling is well known and may be done by the use of Microsoft Excel software. Also, the term "material" shall be understood as comprising a fluid, gas or anything that flows. Further, the non-linear compensation information for the material embodying the flow tube means may include Young's Modulus E as shown as well as other non-linear material properties such as Poisson's ratio, coefficient of thermal expansion as well as others.

What is claimed is:

1. A method of operating apparatus including a Coriolis flowmeter having a fluid flow to derive non-linear temperature compensated output information for said Coriolis flowmeter, said method comprising the steps of:

measuring the operating temperature T of a flow tube means of said Coriolis flowmeter, storing non-linear temperature compensation information for material embodying said flow tube means, defining an expression relating said operating temperature T to said non-linear temperature compensation information, and solving said defined expression to generate non-linear temperature compensated fluid flow output information for said Coriolis flowmeter at said operating temperature T.

2. The method of claim 1 characterized in that said step of solving said defined expression includes the step of determining a non-linear temperature compensated mass flow rate $\dot{M}$ for the fluid flow in said Coriolis flowmeter.

3. The method of claim 1 including the step of storing said operating temperature T is measured in a memory of said Coriolis flowmeter.

4. The method of claim 3 including the steps of:

storing said non-linear temperature compensation information in said memory; and reading said non-linear temperature compensation information out of said memory for use in said defined expression to generate non-linear temperature compensated fluid flow output information for said Coriolis flowmeter at said operating temperature T.

5. The method of claim 3 characterized in that said step of storing said non-linear temperature compensation information comprises the step of storing measured values of Young's modulus E for a predetermined range of temperatures of said material embodying said flow tube means.

6. The method of claim 3 characterized in that said step of storing in memory said non-linear temperature compensation information includes the step of storing measured values of Young's modulus E for a predetermined range of temperatures of said material embodying said flow tube means, said method further includes the steps of:

determining E for said operating temperature T, and using said determined E in said defined expression that is solved to generate said non-linear temperature compensated fluid flow output information.

7. The method of claim 6 characterized in that said step of solving said defined expression includes the step of determining a non-linear temperature compensated mass flow rate $\dot{M}$ for the fluid flow in said Coriolis flowmeter.

8. The method of claim 6 characterized in that said step of using said determined E includes the steps of:

using said operating temperature T to access a location of said memory that stores the value of E corresponding to said operating temperature T, and reading said value of E from said memory for use in solving said defined expression.

9. The method of claim 8 characterized in that said steps of using and reading include the step of:

reading the value of E from said accessed location when said operating temperature T corresponds to a location in said memory;

said method further includes the step of:

determining that a received value of T does not correspond to a location in said memory;

determining the location in said memory corresponding to a value of T that is the closest to said received value of T;

determining a value of E for said received value of T by interpolating of the value of E for said location having a value of T that is the closest to said received value of T; and using said interpolated value of T in said defined expression that is solved to generate said non-linear temperature compensated fluid flow output information.

10. The method of claim 1 characterized in that said step of solving includes the steps of:

obtaining a non-linear expression for said non-linear temperature compensation information as a function of T, and using said non-linear expression for said non-linear temperature compensation information in said defined expression to generate said non-linear temperature compensated fluid flow output information for said Coriolis flowmeter.

11. The method of claim 10 characterized in that said steps of obtaining and using includes the steps of:

obtaining a non-linear expression for Young's modulus E as a function of T, and using said non-linear expression for Young's modulus E in said defined expression to generate said non-linear temperature compensated fluid flow output information for said Coriolis flowmeter.

12. The method of claim 11 characterized in that said step of determining said non-linear temperature compensated flow output information includes the step of determining a non-linear temperature compensated mass flow rate $\dot{M}$ for said fluid flow.

13. The method of claim 1 characterized in that said non-linear temperature compensation information for said material embodying said flow tube means includes measured values of Young's modulus E for a plurality of measured operating temperatures T of said flow tube means; said method including the steps of:

curve fitting said measured values of E to obtain a non-linear expression for E expressed as a function of T, and using said non-linear expression for Young's modulus E in said defined expression to generate said non-linear temperature compensated fluid flow output information for said Coriolis flowmeter.

14. The method of claim 13 characterized in that said measured values of E are stored in a memory of Coriolis flowmeter.

15. The method of claim 13 further comprising the steps of:

receiving said operating temperature T; and applying said operating temperature T to said expression to generate said non-linear temperature compensated fluid flow output information.

16. The method of claim 13 characterized in that said step of curve fitting performs an n order curve fit for said values of Young's modulus E to generate an equation for determining said temperature compensation information wherein n is greater than 1.

17. The method of claim 13 characterized in that said step of curve fitting performs a second order curve fit for said values of Young's modulus E for use in said expression for determining said non-linear temperature compensated fluid flow output information for said Coriolis flowmeter.

18. The method of claim 13 characterized in that said step of curve fitting performs a third order curve fit for said values of Young's modulus E for use in said expression for determining said non-linear temperature compensated fluid flow output information for said Coriolis flowmeter.

19. The method of claim 13 characterized in that said step of curve fitting performs a fourth order curve fit for said values of Young's modulus E for use in said expression for determining said non-linear temperature compensated fluid flow output information for said Coriolis flowmeter.

20. The method of claim 13 characterized in that said step of curve fitting performs a fifth order curve fit for said values of Young's modulus E for use in said expression for determining said non-linear temperature compensated fluid flow output information for said Coriolis flowmeter.

21. The method of claim 1 further including the steps of:
  receiving fluid flow output information that embodies a linear temperature compensation for Young's modulus E of said material embodying the flow tube means of said material embodying the flow tube means of said Coriolis flowmeter;
  receiving the operating temperature T of said Coriolis flowmeter;
  removing said linear temperature compensation from said output information of said Coriolis flowmeter to provide an uncompensated fluid output flow information for said Coriolis flowmeter;
  using said defined expression relating said operating temperature T and to said non-linear temperature compensation information, and
  solving said defined expression to generate non-linear temperature compensated fluid flow output information for said Coriolis flowmeter at said operating temperature T.

22. The method of claim 1 characterized in that said stored non-linear temperature compensation information for said material embodying said flow tube means includes a plurality of non-linear expressions for Young's Modulus E expressed as a function of operating temperature T, said method including the steps of:
  receiving said operating temperature T;
  using said received operating temperature T to select one of said plurality of non-linear expressions;
  using said selected non-linear expression for Young's modulus E in said defined expression to generate said non-linear temperature compensated fluid flow output information for said Coriolis flowmeter.

23. A Coriolis flowmeter comprising:
  flow tube means adapted to be vibrated while receiving a fluid flow,
  meter electronics that receives signals from pick offs coupled to said vibrating flow tube means,
  said signals indicating a phase difference between two points on said flow tube means to which said pick offs are coupled,
  said meter electronics also receives signals indicating an operating temperature T of said flow tube means from a temperature sensor,
  said meter electronics comprising:
  compensation circuitry that relates said operating temperature T to non-linear temperature compensation information for material embodying flow tube means, and
  circuitry that receives said non-linear temperature compensation information, receives said pick offs signals, and applies said non-linear temperature compensation information to generate non-linear temperature compensated fluid flow output information for said Coriolis flowmeter.

24. The Coriolis flowmeter of claim 23 characterized in that said fluid flow output information includes a non-linear temperature compensated mass flow rate $\dot{M}$ of said material flow.

25. The Coriolis flowmeter of claim 23 characterized in that said operating temperature T is measured and stored in a memory of said meter electronics.

26. The Coriolis flowmeter of claim 25 characterized in that said non-linear temperature compensation information for a plurality of operating temperatures is stored in a memory of said meter electronics;
  said meter electronics further comprising look-up circuitry that reads said temperature compensation information for said operating temperature T from said memory for use in said defined expression to generate non-linear temperature compensated fluid flow output information for said Coriolis flowmeter.

27. The Coriolis flowmeter of claim 26 characterized in that said non-linear temperature compensation information comprises measured values of Young's modulus E for a predetermined range of temperatures of said material embodying said flow tube means.

28. The Coriolis flowmeter of claim 26 characterized in that said non-linear temperature compensation information includes measured values of Young's modulus E for a predetermined range of temperatures of said flow tube means, said meter electronics further includes:
  apparatus that generates Young's modulus E for said operating temperature T, and
  apparatus that uses said determined Young's modulus E in said defined expression that is solved to generate said non-linear temperature compensated fluid flow output information.

29. The Coriolis flowmeter of claim 28 characterized in that said fluid flow output information includes the non-linear temperature compensated mass flow rate $\dot{M}$ for said fluid flow in said Coriolis flowmeter.

30. The Coriolis flowmeter of claim 28 characterized in that said Coriolis flowmeter includes:
  apparatus that uses said operating temperature T to access the location of said memory storing the value of Young's modulus E corresponding to said operating temperature T, and
  apparatus that reads said value of Young's modulus E from said memory for use in solving said defined expression.

31. The apparatus of claim 30 characterized in that said apparatus includes: apparatus that reads the value of E from said accessed location when said operating temperature T corresponds to a location in said memory;
  apparatus that determines when a received value of T does not correspond to a location in said memory;
  apparatus that determines the location in said memory corresponding to a value of T that is the closest to said received value of T;

apparatus that determines a value of E for said received value of T by interpolating of the value of E for said location having a value of T that is the closest to said received value of T and that uses said interpolated value of T in said defined expression that is solved to generate said non-linear temperature compensated fluid flow output information.

32. The Coriolis flowmeter of claim 23 characterized in that said meter electronics comprises:

apparatus that stores a non-linear expression for said non-linear temperature compensation information as a function of T, and apparatus that uses said non-linear expression for said non-linear temperature compensation information in said defined expression to generate non-linear temperature compensated flow output information for said Coriolis flowmeter.

33. The Coriolis flowmeter of claim 32 characterized in that said meter electronics includes:

apparatus that stores a non-linear expression for Young's modulus E as a function of T, and apparatus that uses said non-linear expression for Young's modulus E in said defined expression to generate non-linear temperature compensated fluid flow output information for said Coriolis flowmeter.

34. The Coriolis flowmeter of claim 33 characterized in that said apparatus that generates said non-linear temperature compensated flow output information includes apparatus that generates a non-linear temperature compensated mass flow rate $\dot{M}$ for said fluid flow.

35. The Coriolis flowmeter of claim 23 characterized in that said non-linear temperature compensation information includes measured values of Young's modulus E for a range of operating temperatures; said meter electronics further includes;

apparatus that curve fits said measured values of E to obtain said non-linear expression for E expressed as a function of T, and apparatus that uses said non-linear expression for E in said defined expression to generate said non-linear temperature compensated fluid flow output information for said Coriolis flowmeter.

36. The Coriolis flowmeter of claim 35 characterized in that said measured values of E are stored in a memory of said meter electronics.

37. The meter electronics of claim 35 further comprising:

application circuitry in said meter electronics that receives said operating temperature T and said applies said operating temperature T to said expression to generate said temperature compensation information for use in said defined expression to generate non-linear temperature compensated fluid flow output information for said Coriolis flowmeter.

38. The meter electronics of claim 35 further comprising:

apparatus that receives data including Young modulus E for each of a plurality of temperatures and performs an n order curve fit for said values of Young's modulus E to generate an expression for use in determining said temperature compensation output information wherein n is greater than 1.

39. The meter electronics of claim 35 wherein said meter electronics comprises:

circuitry that generates a second order form fit of said values of Young's modulus E to generate said expression for determining said non-linear temperature compensated fluid flow output information for said Coriolis flowmeter.

40. The meter electronics of claim 35 wherein said meter electronics comprises:

circuitry that generates a third order form fit of said values of Young's modulus E to generate said expression for determining said non-linear temperature compensated fluid flow output information for said Coriolis flowmeter.

41. The meter electronics of claim 35 wherein said meter electronics comprises:

circuitry that generates a fourth order form fit of said values of Young's modulus E to generate said expression for determining said non-linear temperature compensated fluid flow output information for said Coriolis flowmeter.

42. The meter electronics of claim 35 wherein said meter electronics comprises circuitry that generates a fifth order form fit of said values of Young's modulus E to generate said expression for determining said non-linear temperature compensated fluid flow output information for said Coriolis flowmeter.

43. The Coriolis flowmeter of claim 23 further including:

apparatus that receives fluid flow output information containing linear temperature compensation for Young's Modulus E of material embodying a flow tube means of said Coriolis flowmeter;

apparatus that receives the operating temperature T of said Coriolis flowmeter;

apparatus that removes said linear temperature compensation from said output information of said Coriolis flowmeter to provide an uncompensated fluid output flow information for said Coriolis flowmeter;

apparatus that uses said defined expression relating said operating temperature T and to said non-linear temperature compensation information, and apparatus that solves said defined expression to generate non-linear temperature compensated fluid flow output information for said Coriolis flowmeter at said operating temperature T.

44. The Coriolis flowmeter of claim 23 characterized in that said stored non-linear temperature compensation information includes a plurality of non-linear expressions for Young's Modulus E expressed as a function of operating temperature T, said meter electronics further includes;

apparatus said receives said operating temperature T;

apparatus that uses said received operating temperature T to select one of said plurality of non-linear expressions;

apparatus that uses said selected non-linear expression for E in said defined expression to generate said non-linear temperature compensated flow output information for said Coriolis flowmeter.

* * * * *

UNITED STATES PATENT AND TRADEMARK OFFICE
CERTIFICATE OF CORRECTION

PATENT NO. : 6,512,987 B1
DATED : January 28, 2003
INVENTOR(S) : Andrew T. Patten It is certified that error appears in the above-identified patent and that said Letters Patent is hereby corrected as shown below:

Title page,
Item [75], Inventor, replace "Andrew T. Pattern, Boulder, CO (US)"
with -- Andrew T. Patten, Boulder, CO (US) --

Column 4,
Line 49, replace "Preferably said steps of obtain and using inludes the steps" with
-- Preferably said steps of obtain and using includes the steps --
Line 62, replace "information information for said material embodying said" with
-- information for said material embodying said --

Column 5,
Line 17, replace "said expression for determining said non-linear temperature"
with -- in said expression for determining said non-linear temperature --
Line 21, replace "curve fit for said values of Young's Modulus E for use said"
with -- curve fit for said values of Young's Modulus E for use in said --

Column 6,
Line 42, replace "non-linear temperature compensated mass flow rate $\dot{M}$ or"

with -- non-linear temperature compensated mass flow rate $\dot{M}$ for --

Column 7,
Line 21, replace "apparatus that curves fits said measured values of E to" with
-- apparatus that curve fits said measured values of E to --

Column 17,
Line 45, replace "steps 701 and 703 may be done off-line with derived" with
-- steps 701 and 703 may be done off-line with the derived --
Line 60, replace "1, and interpolation process is used to determine the appli-" with
-- 1, an interpolation process is used to determine the applic- --

Column 18,
Line 6, replace "The process begins in step 911 in which the data of table 1" with
-- The process begins in step 901 in which the data of table 1 --

UNITED STATES PATENT AND TRADEMARK OFFICE
CERTIFICATE OF CORRECTION

PATENT NO. : 6,512,987 B1
DATED : January 28, 2003
INVENTOR(S) : Andrew T. Patten It is certified that error appears in the above-identified patent and that said Letters Patent is hereby corrected as shown below:

Column 21,
Line 28, replace "said material embodying the flow tube means of said" with -- said --

Column 22,
Line 9, replace "information to generate non-linear temperature com-" with
-- information to a defined material flow expression to generate non-linear temperature com- --

Signed and Sealed this

Twenty-eighth Day of October, 2003

JAMES E. ROGAN
*Director of the United States Patent and Trademark Office*